Dec. 15, 1931.   J. BECKER   1,836,004
APPARATUS FOR TREATING GAS
Filed April 30, 1927   4 Sheets-Sheet 1

INVENTOR.
Joseph Becker.
Fig. 1   BY Jesse R. Langley
ATTORNEY

Dec. 15, 1931.  J. BECKER  1,836,004
APPARATUS FOR TREATING GAS
Filed April 30, 1927   4 Sheets-Sheet 2

INVENTOR.
Joseph Becker.
BY Jesse R. Langley
ATTORNEY

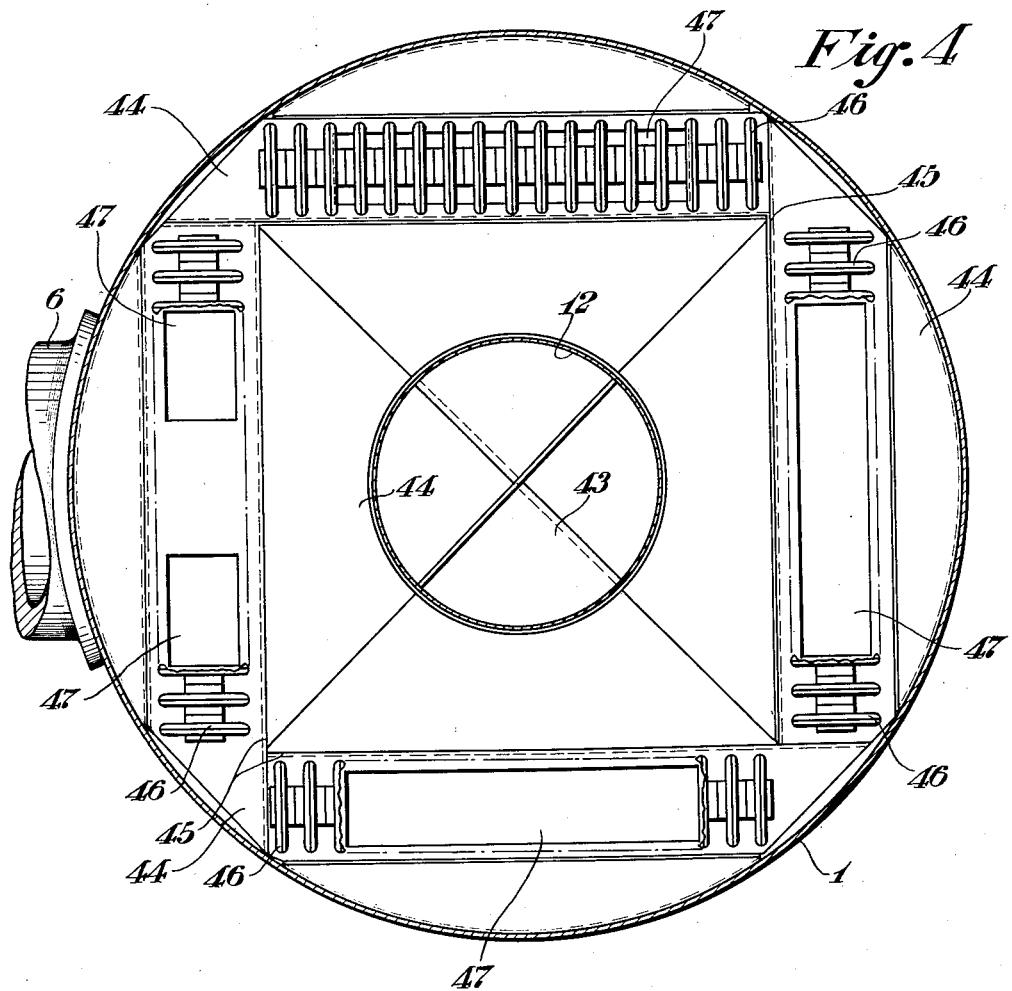
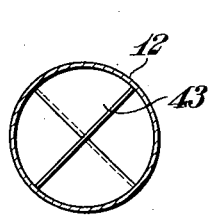
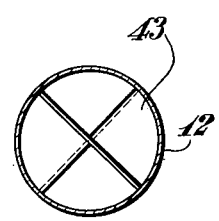

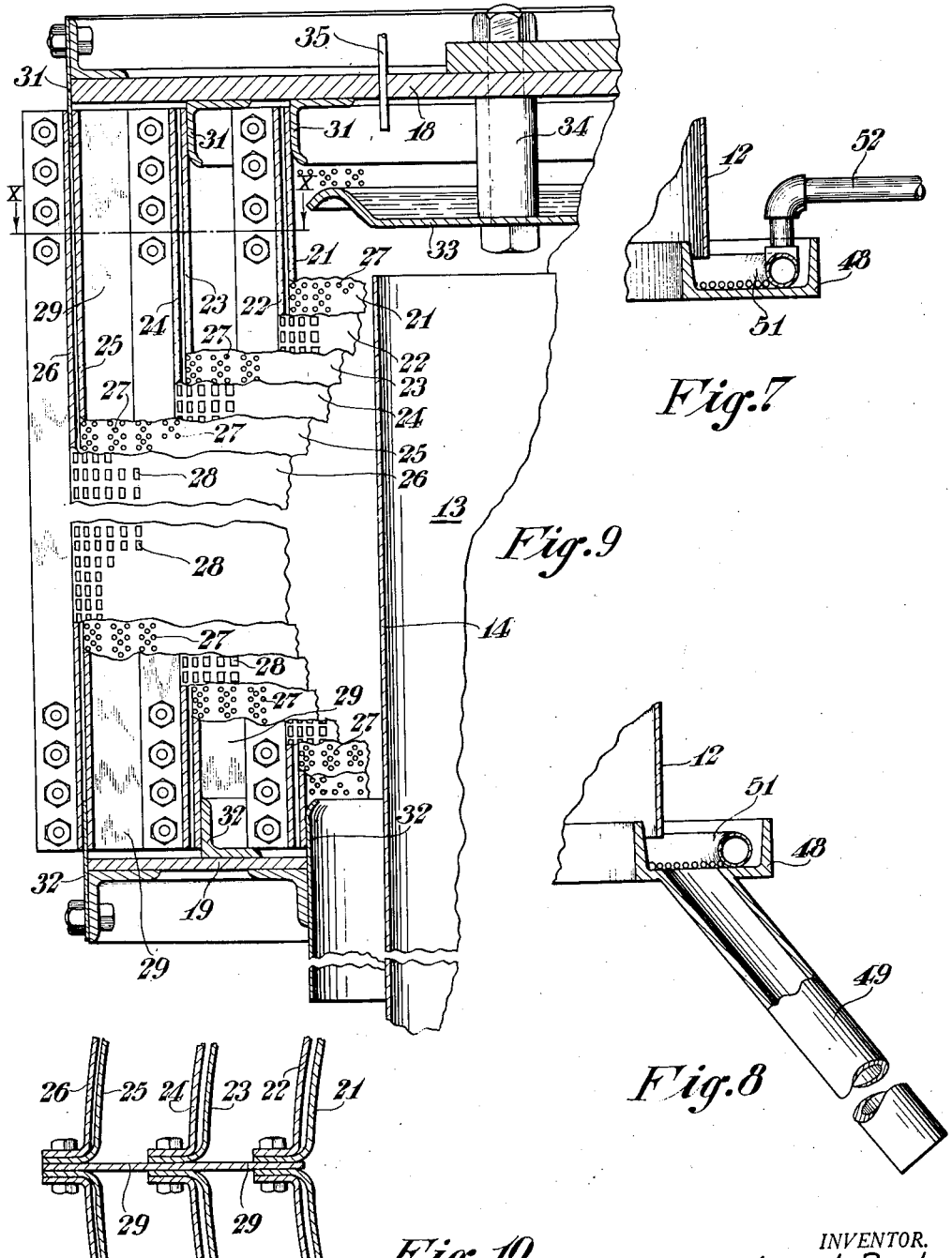

Patented Dec. 15, 1931

1,836,004

UNITED STATES PATENT OFFICE

JOSEPH BECKER, OF PITTSBURGH, PENNSYLVANIA, ASSIGNOR TO THE KOPPERS COMPANY, A CORPORATION OF DELAWARE

APPARATUS FOR TREATING GAS

Application filed April 30, 1927. Serial No. 187,804.

This invention relates to the treatment of gas, more particularly fuel gas, such as coal gas, coke oven gas, and the like, for the removal of tarry matter contained by the gas and, also, for conditioning the gas prior to removal of ammonia therefrom.

An object of the present invention is to provide highly efficient apparatus for such treatment of gas and which are simplified with respect to prior practice.

A further object of my invention is to provide an apparatus which will eliminate certain disadvantages of prior practice.

My invention has for further objects such other operative advantages or results as may hereinafter be found to obtain.

Fuel gas obtained from the distillation of carbonaceous material, such as is produced in coke ovens and the like, contains considerable amounts of tarry matter and ammonia. It is desirable to remove both of these impurities from the gas prior to use. The recovery of ammonia is more or less generally accomplished by passing the gas through a bath of sulphuric acid contained in the well-known saturator. Ammonia present in the gas reacts with the acid to form ammonium sulphate, which, being relatively insoluble in the acid, may be recovered therefrom in crystalline form.

When gas is treated for the recovery of ammonia according to this method, it is desirable to free the gas as much as possible from tarry matter before passing it into the saturator as the presence of tarry matter in the gas being treated for the recovery of ammonia would cause discoloration and contamination of the ammonium sulphate produced. Removal of a large portion of the tar is generally effected in the collecting mains, primary coolers, and the like, that are traversed by the gas after leaving the distillation chamber, but some tar still remains in the gas, and it is generally necessary to cool the gas considerably in order to effect a reasonably thorough removal of this remaining tar. Removal of this relatively difficultly separable tar is then effected, usually in the well-known Pelouze and Audouin tar extractor, after which the gas is reheated prior to treatment in the saturator for removal of ammonia.

It has been the practice in the past to provide separate tar extractors and reheaters for accomplishing the functions of tar removal and reheating prior to ammonia recovery. In the present instance, I provide apparatus for conditioning the gas for recovery of ammonia therefrom, which comprises tar-separating means of the so-called static type, and includes also means for heating the gas after removal of the tar therefrom, thereby obviating the necessity of providing separate apparatus for such purpose.

In the static type of tar extractor, such as the Pelouze and Audouin extractor, removal of tar is effected by causing the gas to pass through a plurality of foraminous walls so disposed that the orifices in one wall are opposite blank spaces in the adjacent wall or baffle. This is known as "wire-drawing", and is effective to reduce the tar from more or less nebulous state, i. e., in exceedingly fine suspension, to a globular state, i. e., in suspension in the form of relatively large particles. When such particles impinge upon surfaces or walls in the path of the gas, they adhere thereto sufficiently to obviate being re-entrained by the gas, but drain down upon such surfaces or walls, being thereby removed from the gas stream.

It is well known that the operation of static tar extractors leaves something to be desired in the way of thorough tar removal. I have discovered that, if the gas is caused to assume a whirling or spiral motion, globules of tar suspended in the gas may be caused to impinge upon the walls of the conduit through which the gas is passed, by reason of centrifugal force, and the tar adheres to said walls and may be drained therefrom, thus effecting its removal from the gas.

In the preferred embodiment of my invention, the elements of the initial tar removal, the conduit wherein the gas is given a whirling motion for the further separation of tar globules, and the reheating means, are brought together in convenient arrangement as regards effectiveness, space required, and the like.

In order that my invention may be clearly set forth and understood, I now describe the preferred manner in which it is embodied and practiced with reference to the accompanying drawings.

In the drawings,

Figs. 2, 3, 4, 5 and 6 are horizontal sectional views of the apparatus shown in Fig. 1, taken upon the lines II—II, III—III, IV—IV, V—V and VI—VI, respectively, of that figure, Fig. 4 being enlarged;

Figs. 7 and 8 are enlarged vertical sectional views taken respectively on lines VII—VII and VIII—VIII of Fig. 3 of a portion of the apparatus shown in Fig. 1;

Fig. 9 is an enlarged elevational view of a portion of the apparatus shown in Fig. 1, parts being shown broken away; and Fig. 10 is a horizontal sectional view, taken on the line X—X of Fig. 9.

Similar numerals indicates similar parts in each of the views of the drawings.

Figure 1:
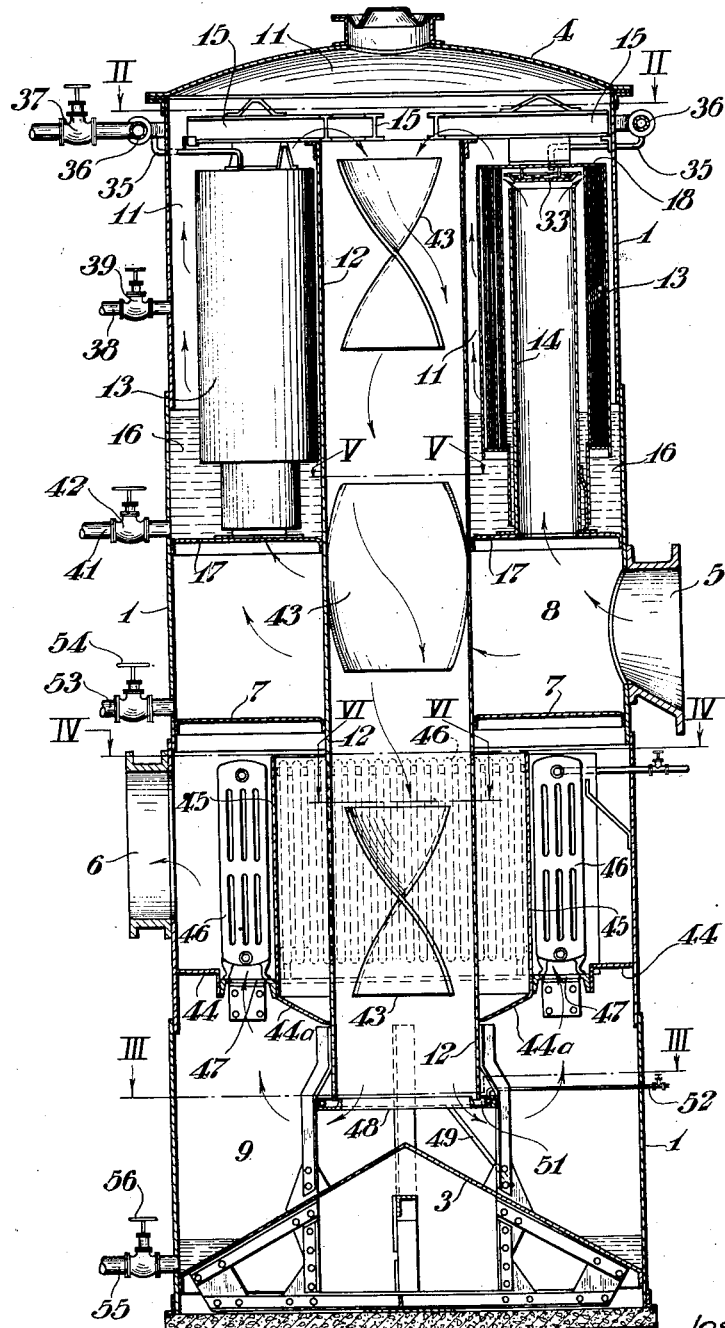
Figure 1 is a vertical sectional view of apparatus for treating gas to remove tar therefrom and for reheating the gas.
Figure 2:
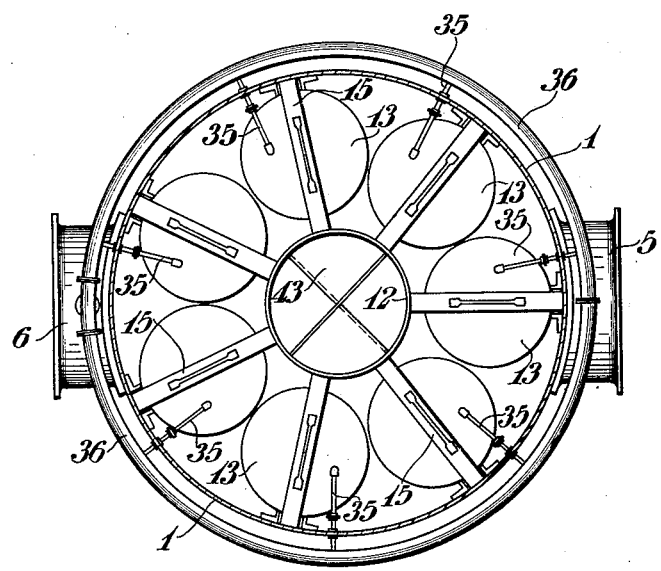
Figure 3:
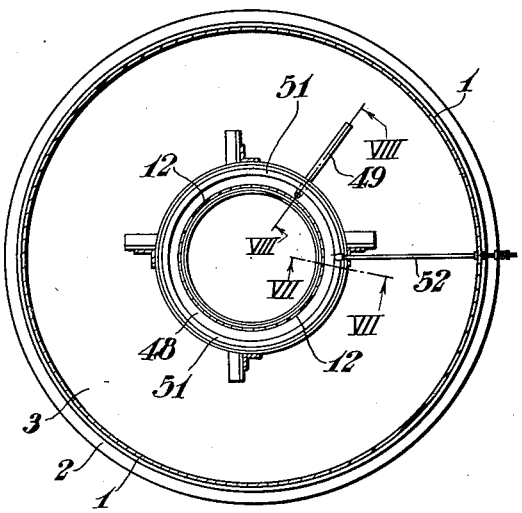

The apparatus of my invention is preferably disposed within a vertical cylindrical shell 1, that is provided with a base 2, a conical false bottom 3, and a cover 4. The shell 1 is further provided with a gas inlet conduit 5, situated about midway of its height, a gas outlet conduit 6 and a horizontal wall 7 that divides the interior of the shell 1 into an upper compartment 8 and a lower compartment 9. Communication between the upper portion 11 of the compartment 8 and the compartment 9 is provided by a vertically disposed conduit 12 that passes through the wall 7.

The compartment 8 is provided with a plurality of bells 13, the construction of which will be described below. The bells 13 are suspended over and around vertical conduits 14 from beams 15, and are preferably partially immersed in a bath of ammoniacal liquor 16 of variable depth. The compartment 8 is further provided with a horizontal division wall 17 with a plurality of openings communicating with the conduits 14 and which serves, in conjunction with the sides of the shell 1, and the conduits 14, as means for supporting the bath of ammoniacal liquor 16 in the upper portion 11 of the compartment 8.

The bells 13, which are suspended over the vertical conduits 14, are preferably of cylindrical configuration, although they may be of polygonal configuration, if so desired. Each of the bells 13 is provided with a cover 18 and an annular base plate 19. The sides of the bells 13 comprise foraminous baffles 21, 22, 23, 24, 25 and 26. The baffles 21 to 26 are arranged concentrically in three spaced sets, each set comprised of an inner baffle that is provided with a great number of relatively minute orifices 27, such as the baffles 21, 23 and 25, and an outer baffle that is relatively slightly spaced therefrom and provided with a relatively small number of relatively larger orifices or slots 28, such as the baffles 22, 24 and 26.

Theoretically, it is desirable to provide that the orifices 27 and slots 28 be staggered in such manner that the blank spaces between the slots 28 shall be opposite the orifices 27. In practice, it is not necessary to adhere to this arrangement strictly, but dimensions may be adopted which give approximately the theoretical condition and such approximations have been found to be satisfactory. The baffles 21 to 26 are supported in coaxial relation by means of vertical radial plates 29.

The plates 29 extend between the covers 18 and the base plates 19, and the latter are provided with guides 31 and 32, respectively, for securing the baffles 21 to 26 in position.

Immediately above the upper end of the conduits 14 I provide dished baffles 33, fastened to and a short distance from the covers 18 by fastening means 34. The outer peripheries of the baffles 33 are of somewhat larger diameter than the conduits 14 and said baffles are adapted to receive ammoniacal liquor introduced from conduits 35. The conduits 35 are supplied with ammoniacal liquor through a manifold 36, regulation of the amount of liquor introduced being possible by means of a valve 37.

The ammoniacal liquor overflowing the outer edges of the baffle 33 is caused to pass downward over the baffles 21 to 26, forming the sides of the bells 13 and is effective to prevent substantial clogging of the orifices therein. Further ammoniacal liquor may be introduced to the bath 16 through a conduit 38 that is provided with a valve 39 and the ammoniacal liquor introduced through conduits 35 and 38 and containing tar removed from the gas during its passages over and through the bells 13 may be removed from the bath 16 through a conduit 41 that is provided with a valve 42.

The upper portion 11 of the compartment 8 communicates with the compartment 9 through the conduit 12. The conduit 12 is provided with a plurality of spirally warped vanes 43 that are adapted to force gas passing through the conduit 13 to assume a spiral or whirling motion. Preferably the vanes 43 are comprised of plates which have been bent in such manner as to produce an angle of about 90° in the horizontal plane between the upper and lower edges thereof and such vanes are situated within the conduit 12 in such manner that the upper edges of adjacent vanes shall be at an angle of 90° with each other and also in such manner as to induce a substantially continuous spiral path of the gases through the conduit 12.

The conduit 12 terminates at its lower end a short distance above and opposite to the conical plate 3, in the compartment 9. The compartment 9 is provided with a horizontal division wall 44, situated about midway of its height. The baffle 44a adjoins the lower end of a vertical baffle 45 that is preferably of rectangular form. Adjacent to each of the four sides of the baffle 45 and between said sides and the wall of the shell 1, I provide a radiator 46, or other coil adapted to receive steam. In the present instance, the usual form of radiator employed for heating rooms and the like is shown. Any other form of steam-heating coil may be substituted therefor with satisfactory results. I further provide an opening 47 in the division wall 44, below each of the radiators 46.

It will be noted, from inspection of Fig. 4, that the opening 47 below that radiator 46 adjacent to the outlet 6, is divided into two spaced parts. This opening may, in fact, be omitted entirely, in which instance passage for gas through the division wall 44 is provided only on those three sides of the baffle 45 that are remote from the outlet 6. My apparatus is preferably situated in the path of the gas either immediately before or immediately after said gas passes through the exhausters, which serve to force the gas through the various by-product recovery and purification apparatus.

Gas enters the upper compartment 8 through inlet 5 and passes upward through conduits 14. The gas is deflected by the baffles 33 and passes through the large number of stack orifices and slots in the sides of the bells 13. Tar present in the gas in relatively nebulous form is thereby converted to globular form and much of the latter impinges upon the baffle sides of the bells 13 and is washed off by the spray of ammoniacal liquor from the conduits 35 to drain into the liquor bath 16. The gas emerges from the bells 13 into the upper portion 11 of the compartment 8 and passes downwardly through the conduit 12 into the lower compartment 9.

During the passage of the gas through the conduit 12, it is caused to assume a whirling motion by the vanes 43, within the conduit 12 and globules of tar and liquor are caused, by reason of centrifugal force, to be thrown out against the walls of the conduit 12 to which they adhere.

The gas traverses the lower portion of the compartment 9 and passes upward through the openings 47 in the division wall 44. The gas then passes around and through the heated radiators 46 and over and around the baffle 45, finally emerging from the apparatus in heated and substantially tar-free condition to the outlet 6.

Tar which impinges upon the walls of the conduit 12 and adhering thereto flows downwardly, if allowed to drop across the path of the gas from the lower end of the conduit 12 to the false bottom 3 would be partially entrained by the gas and would partially defeat the purpose of the tar extractor. Consequently, I provide an annular channel 48 adjacent to and immediately below the lower end of the conduit 12. The channel 48 is provided with a drain line 49 and a steam-heating coil 51, supplied with steam through a line 52. Tar draining from the lower end of the conduit 12 falls by gravity into the channel 48 and passes through the drain 49 into the bottom of the compartment 9 out of contact with the gas, thus preventing re-entrainment of the tar separated from the gas during its passage through the conduit 12.

As is common practice when using foraminous baffles or other tar extractors, I may provide automatic control means for regulating the depth of the liquid bath 16 in such manner as to maintain a constant pressure loss through the apparatus. Thus, if a considerable number of orifices in the baffle sides of the bell 13 become obstructed through deposits of tar or pitch, such control means operates to reduce the amount of ammoniacal liquor introduced through conduit 38 and to decrease the depth of the bath 16, thus exposing additional orifices in the bells 13 and maintaining a substantially constant pressure loss, due to passage of the gas through such orifices. For example, I may employ such automatic control means as that illustrated and described in U. S. Patent No. 1,337,984, granted April 20, 1920, to Joseph Becker.

For removing any moisture or tar precipitated from the gas in that portion of the compartment 8 below the wall 17, I provide a drain 53 that is provided with a valve 54, while, for removing further amounts of tar from the bottom of the compartment 9, I provide a conduit 55 that is provided with a valve 56. The mixture of ammoniacal liquid and tar removed from the apparatus by means of conduits 41, 53 and 55 is treated in the usual manner to separate such constituents and for the further recovery of ammonia therefrom.

While I have described my invention with relation to certain specific means for reducing the tarry content of the gas being treated from nebulous to globular form for removing globules of tar produced thereby and for reheating the gas, it will be understood that my invention is not limited to such specific means shown herein by way of example and illustration. Other means for accomplishing the same functions may be substituted for such specific means.

My invention provides efficient apparatus for the removal of tar from gas and for otherwise conditioning the gas prior to recovery of ammonia therefrom and in which the various parts are conveniently and advantageously situated with respect to each other and with respect to the gas treatment apparatus as a whole and also in which functions at present accomplished in separate units may be accomplished in a single apparatus. The apparatus of my invention results in an increased efficiency and in a saving in ground space and convenience, respectively.

Although I have described my invention above with relation to certain specific examples by way of illustration, it is not limited to such example but may be variously embodied within the scope of the following claims.

I claim as my invention:

1. Apparatus for removing tar from gas which comprises a plurality of foraminous baffles, means for spraying said baffles with liquor and a duct, situated in the path of the gas leaving said baffles, said duct being provided with vanes for imparting a whirling motion to the gas passing therethrough.

2. Apparatus for treating gas prior to treating it for the removal of ammonia which comprises a chamber provided in its upper portion with a plurality of sealed foraminous bells, a vertically disposed duct provided with vanes for imparting a whirling motion to the gas, and heating means contiguous to said duct effective to heat the gas, leaving said duct and also to heat said duct.

3. Apparatus for treating gas to condition said gas for the recovery of ammonia therefrom which comprises a chamber enclosing a plurality of foraminous baffles adapted to precipitate tar from the gas, a vertically disposed duct adapted to conduct the gas from said bell chamber and provided with at least one spirally warped vane, and a heating compartment in communication with and adjacent to said duct.

4. Apparatus for removing tar from gas and heating the same which comprises a chamber divided into two compartments, one of said compartments containing a tar extraction device and the other containing means for heating the gas, and a duct extending from said tar extraction compartment into said heating compartment and provided with means for imparting a swirling motion to the gas passing through said duct, the relative position of said duct and said heating compartment being such that the walls of said duct are heated but only to such extent as will not materially affect the temperature of the entire stream of gas passing therethrough.

In testimony whereof, I have hereunto subscribed my name this 27th day of April, 1927.

JOSEPH BECKER.